United States Patent Office 3,517,011
Patented June 23, 1970

3,517,011
N-AMIDINO-4-AMINO-2-SUBSTITUTED
5-PYRIMIDINECARBOXAMIDE
Dong H. Kim, Wayne, Arthur A. Santilli, Havertown, and Scott J. Childress, Philadelphia, Pa., assignors to American Home Products Corporation, New York, N.Y., a corporation of Delaware
No Drawing. Filed Apr. 5, 1968, Ser. No. 719,242
Int. Cl. C07d 51/42
U.S. Cl. 260—256.4
6 Claims

ABSTRACT OF THE DISCLOSURE

This invention concerns N-amidino-4-amino-2-substituted-5-pyrimidinecarboxamides which are useful as anti-amebic agents.

This invention relates to new and novel N-amidino-4-amino-2-substituted-5-pyrimidinecarboxamides which in standard and accepted tests have demonstrated utility as anti-amebic agents.

The new and novel compounds within the scope of the present invention are represented by the following structural formula:

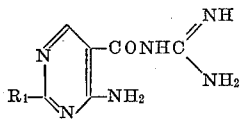

wherein $R_1$ is selected from the group consisting of lower alkyl, phenyl, halophenyl, lower alkylphenyl and lower alkoxyphenyl. As employed herein the terms "lower alkyl," "lower alkoxy" and the like are meant to include both straight and branched moieties having from one to eight carbon atoms. Typical examples thereof are: N-amidino-4-amino-2 - phenyl - 5 - pyrimidinecarboxamide; and N-amidino - 4-amino-2-p-chlorophenyl)5-pyrimidine-carboxamide; N-amidino-4-amino-2-methyl-5-pyrimidine-carboxamide; N - amidino-4-amino-2-(p-tolyl)-5-pyrimidinecarboxamide; and N-amidino-4-amino-2-(p-methoxyphenyl)-5-pyrimidinecarboxamide.

The new and novel N-amidino-4-amino-2-substituted-5-pyrimidinecarboxamides of the present invention may be prepared by the process which is hereinafter schematically illustrated:

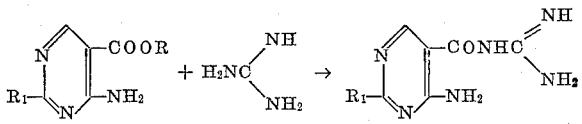

wherein $R_1$ is defined as above and R is lower alkyl. This reaction is affected by reacting a 4-amino-5-carb(lower) alkoxy-2-substituted pyrimidine (I) with guanidine (II) in an alkanol at about reflux temperatures for a period of about fifteen minutes to about one hour.

When the reaction is complete, the resulting N-amidino-4-amino-2-substituted-5-pyrimidinecarboxamide (III) is separated by standard recovery procedures e.g. the precipitated product (III) is separated by filtration, washed with water and recrystallized from a suitable solvent e.g. an alkanol, dimethylformamide and the like.

Preferably the guanidine employed in the above process is prepared by contacting with stirring an appropriate guanidine hydrohalide with an alkanol e.g. methanol and an alkali metal alkoxide e.g. sodium methoxide at about room temperature for a period of about fifteen minutes to about two hours. Thereafter, the precipitated inorganic salt which forms is removed by filtration under an inert atmosphere e.g. nitrogen and the bulk of the solvent is removed under reduced pressure. The resulting concentrated alkanolic e.g. methanolic guanidine solution is then employed as such in the above-described reaction. The 4-amino-5-carb(lower)alkoxy-2-substituted pyrimidine (I) starting materials employed in the above process are prepared by the process described by Foldi and Weitkamp in Ann. 622, p. 121 (1959). The guanidine hydrohalides employed to prepare guanidine (II) are commercially available.

The N-amidino-4-amino-2-substituted - 5 - pyrimidine-carboxamides (III) of the present invention possess valuable amebicidal activity. In particular, in standard in vitro screening procedures these compounds have demonstrated anti-amebic activity, especially against *Endameba histolytica* and are useful as anti-amebic agents.

In the amebicidal evaluation of the compounds of this invention, the test substance is incorporated and diluted in the aqueous phase of Boeck-Drbohlav diphasic medium fortified with rice starch. The medium is inoculated with polybacteria and a known number of trophozoites of *E. histolytica* NIH 200. After forty-eight hours incubation at 35° C., the trophozoites are counted. The procedure is derived from Thompson et al., Antibio. and Chemo., 6, 337–50 (1956). The endpoint is expressed as the percent of *E. histolytica* killed at a particular concentration ($\mu$g./ml.) of test compound. In this test the 4-amidino-4-amino-2-substituted-5-pyrimidinecarboxamides (III) of this invention average about a thirty-five percent kill of *E. histolytica* at a concentration of 250 $\mu$g./ml. and about a sixty-seven percent kill of *E. histolytica* at 1000 $\mu$g./ml.

The anti-amebic activity of the compounds (III) of this invention can be utilized for washing equipment in hospitals and homes, instruments used in medicine and bacteriology, clothing used in bacteriological laboratories, and floors, walls and ceiling in rooms in which a background free of *E. histolytica* is desired.

The 4-amidino-4-amino - 2 - substituted-5-pyrimidine-carboxamides (III) of the present invention are useful in a number of compositions comprising the active compound and an inert material. In such compositions, while the active compounds (III) of this invention may be employed in concentrations as low as 250 p.p.m., from a practical point of view, it is desirable to use from about 0.05% by weight, to about 5% by weight or more. In particular, useful compositions for use as washing solutions, the active compounds of this invention may be used generally in the range of from 0.025% to 0.25% by weight.

The 4-amidino - 4 - amino-2-substituted-5-pyrimidine-carboxamides (III) of the present invention can readily be formulated by those skilled in the art into a wide variety of amebicidal compositions. The examples hereinafter will provide details for doing so in representative instances. However, in general, standard techniques can be employed. For example, the active compounds per se can be made up in stock solutions. They can also be formulated as suspensions in an aqueous vehicle. These make useful mixtures to decontaminate premises. Also, aqueous vehicles containing emulsifying agents, such as, sodium lauryl sulfate, and relatively high concentrations e.g. up to about 5% by weight, of a 4-amidino-4-amino-2-substituted-5-pyrimidine-carboxamide (III) can be formulated by conventional techniques.

EXAMPLE I

Eleven grams of guanidine hydrochloride is added to 70 ml. of dried methanol containing 2.3 g. of sodium as sodium methoxide, and the resulting mixture is stirred mechanically for twenty-five minutes at room temperature. The inorganic salt is removed by filtration under a dry nitrogen atmosphere. After removing the bulk of the methanol under reduced pressure with the exclusion of moisture, 3.6 g. of 4-amino-5-carbethoxy-2-phenylpyrimidine is added to the concentrated solution, and the mixture heated to reflux for fifteen minutes. A solid is deposited from the reaction mixture which is collected on a filter and washed several times with water. Recrystallization from absolute ethanol affords 2.3 g. of N-amidino-4-amino-2-phenyl - 5 - pyrimidinecarboxamide, M.P. >360° C.

*Analysis.*—Calcd. for $C_{12}H_{12}N_6O$ (percent): C, 56.24; H, 4.72; N, 32.80. Found (percent): C, 56.34; H, 4.75; N, 32.64.

In a similar manner, guanidine is reacted with 4-amino-5-carbomethoxy-2-(p-chlorophenyl)pyrimidine to afford N-amidino-4-amino-2-(p-chlorophenyl) - 5 - pyrimidinecarboxamide.

EXAMPLE II

Twenty-two grams of guanidine hydrochloride is added to 140 ml. of dried ethanol containing 4.6 g. of sodium ethoxide, and the resulting mixture is stirred mechanically for two hours at room temperature. The inorganic salt is removed by filtration under a dry nitrogen atmosphere. After removing the bulk of the ethanol under reduced pressure with the exclusion of moisture, 7.2 g. of 4-amino-5-carbethoxy-2-methylpyrimidine is added to the concentrated solution, and the mixture heated to reflux for one hour. The solid which precipitates is collected on a filter, washed with water and recrystallized from absolute ethanol to afford N-amidino-4-amino-2-methyl-5-pyrimidinecarboxamide.

In like manner, N-amidino-4-amino-2-ethyl-5-pyrimidinecarboxamide; and N-amidino-4-amino-2-butyl-5-pyrimidinecarboxamide are synthesized.

EXAMPLE III

Five and a half grams of guanidine hydrobromide is added to 35 ml. of dried methanol, containing 1.7 g. of potassium as potassium methoxide, and the resulting mixture is stirred for one hour at room temperature. The precipitated inorganic salt is then removed by filtration under a dry nitrogen atomsphere. After removing the bulk of the methanol under reduced pressure in the absence of moisture, 1.8 g. of 4-amino-5-carbethoxy-2-(p-tolyl)pyrimidine is added to the concentrated solution, and the mixture heated to reflux for a half hour. A solid precipitation from the reaction mixture is collected on a filter and washed with water. Recrystallization from absolute methanol affords N-amidino-4-amino-2-(p-tolyl)-5-pyrimidinecarboxamide.

EXAMPLE IV

When the procedure of Examples I–III is repeated to react an appropriate 4-amino-5-carb(lower)alkoxy-2-substituted pyrimidine with guanidine the following compounds are obtained:

N-amidino-4-amino-2-(o-bromophenyl)-5 - pyrimidinecarboxamide;

N-amidino-4-amino-2-(p - methoxyphenyl) - 5 - pyrimidinecarboxamide;

N-amidino-4-amino-2-(p - iodophenyl) - 5 - pyrimidinecarboxamide;

N-amidino-4-amino-2-(p-isopropylphenyl) - 5 - pyrimidinecarboxamide;

N-amidino-4-amino-2-(p-fluorophenyl)-5 - pyrimidinecarboxamide;

N-amidino-4-amino-2-(p-ethoxyphenyl)-5 - pyrimidinecarboxamide; and

N-amidino-4-amino-2-(m-chlorophenyl)-5 - pyrimidinecarboxamide.

EXAMPLE V

An amebicidally active wash solution is prepared as follows:

| Components: | Parts by wt. |
|---|---|
| Potassium tripolyphosphate | 19.5 |
| Sodium tripolyphosphate | 5.0 |
| Alkyl aryl sulfonate anionic detergent | 33.0 |
| Lauric acid alkanolamine condensate | 5.0 |
| Carboxymethylcellulose | 0.5 |
| N-amidine-4-amino-2-phenyl-5-pyrimidinecarboxamide | 1.0 |

The above components are mixed together at 22° C. to form the final product.

EXAMPLE VI

An amebicidally active industrial cleaning composition is prepared as follows:

| Components: | Parts by wt. |
|---|---|
| Neutral soap (K and Na soaps of stearic, palmitic and oleic acid) | 30.0 |
| Bentonite | 30.0 |
| Sodium lauryl sulfate | 10.0 |
| Lanolin | 5.0 |
| N-amidino-4-amino-2-(p-chlorophenyl)-5-pyrimidinecarboxamide | 1.5 |

The bentonite and sodium lauryl sulfate are mixed together. The soap and lanolin are mixed with the N-amidino-4-amino-2-(p-chlorophenyl)-5 - pyrimidinecarboxamide and heated to about 70° C., after which they are mixed with the bentonite and sodium lauryl sulfate. The product may then be pressed into cake form, or 27 parts of corn meal may be mixed with 75 parts of the mixture to form a powdered amebicidally active soap composition.

EXAMPLE VII

A biocidally-active composition useful to decontaminate premises which have been infected with *E. histolytica* is prepared by disolving N-amidino-4-amino-2-phenyl-5-pyrimidinecarboxamide in methanol and adding water to provide a concentration of 3.0 g. per liter of formulation. If, during formulation, the addition of water causes the active compound to precipitate, more of the co-solvent (methanol) is added.

What is claimed is:

1. A compound selected from the group consisting of those having the formula:

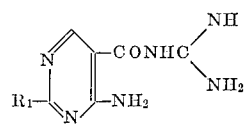

wherein $R_1$ is selected from the group consisting of lower alkyl, phenyl, halophenyl, lower alkylphenyl and lower alkoxyphenyl.

2. A compound as described in claim 1 which is: N-amidino-4-amino-2-phenyl-5-pyrimidinecarboxamide.

3. A compound as described in claim 1 which is: N-amidino - 4 - amino-2-(p-chlorophenyl)-5-pyrimidinecarboxamide.

4. A compound as described in claim 1 which is: N-amidino-4-amino-2-methyl-5-pyrimidinecarboxamide.

5. A compound as described in claim 1 which is: N-amidino-4-amino-2-(p-tolyl)-5-pyrimidinecarboxamide.

6. A compound as described in claim 1 which is: N-amidino-4-amino-2-(p-methoxyphenyl)-5 - pyrimidinecarboxamide.

References Cited

UNITED STATES PATENTS 3,284,452  11/1966  Schmidt et al. _____ 260—256.4

ALEX MAZEL, Primary Examiner

R. J. GALLAGHER, Assistant Examiner

U.S. Cl. X.R.

424—251

PO-1050
(5/69)

UNITED STATES PATENT OFFICE
CERTIFICATE OF CORRECTION

Patent No. 3,517,011          Dated June 23, 1970

Inventor(s) Dong H. Kim and Arthur A. Santilli

It is certified that error appears in the above-identified patent and that said Letters Patent are hereby corrected as shown below:

Column 1, line 50, in the equation, the second bond between the C and NH in the guanidine is lacking; i.e., the formula "$H_2NC{<}^{NH}_{NH_2}$" should read -- $H_2NC{<}^{=NH}_{NH_2}$ --; and Column 4, claim 1, in the formula, the double bond between the C and NH is lacking; i.e, in the formula appearing as "[pyrimidine ring with $R_1$, $NH_2$, $CONHC{<}^{NH}_{NH_2}$]" should read -- [pyrimidine ring with $R_1$, $NH_2$, $CONHC{<}^{=NH}_{NH_2}$] --

SIGNED AND
SEALED
OCT 20 1970

(SEAL)
Attest:

Edward M. Fletcher, Jr.
Attesting Officer

WILLIAM E. SCHUYLER, JR.
Commissioner of Patents